March 23, 1948.   B. DICK   2,438,153
PISTON AND SEAL
Filed Jan. 7, 1944
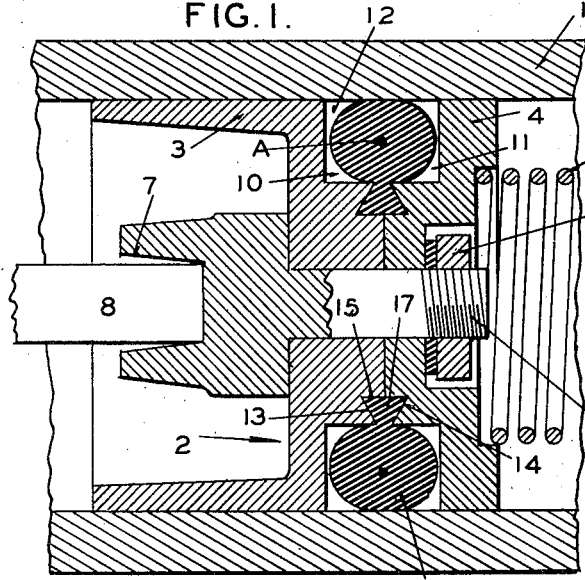
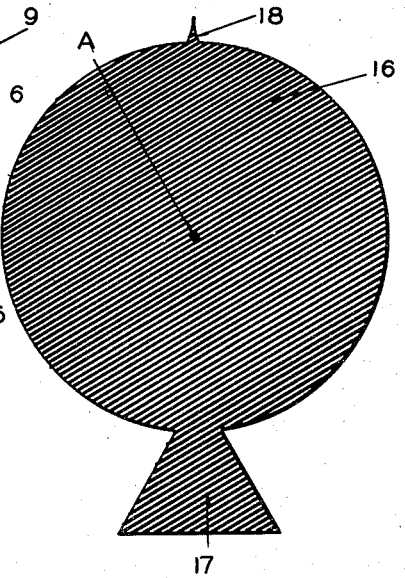
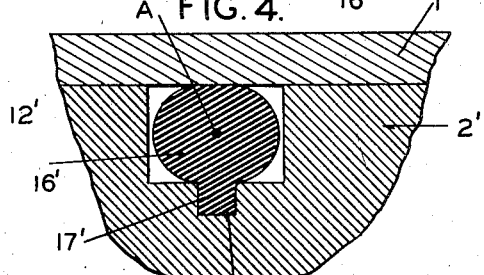
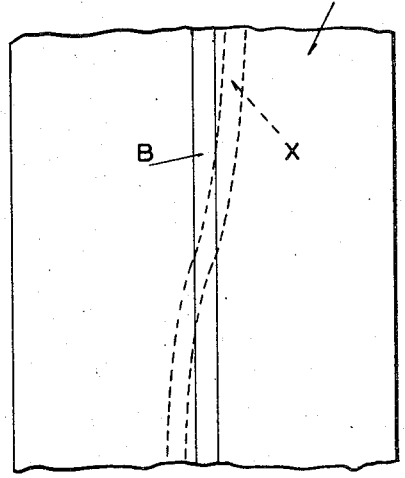
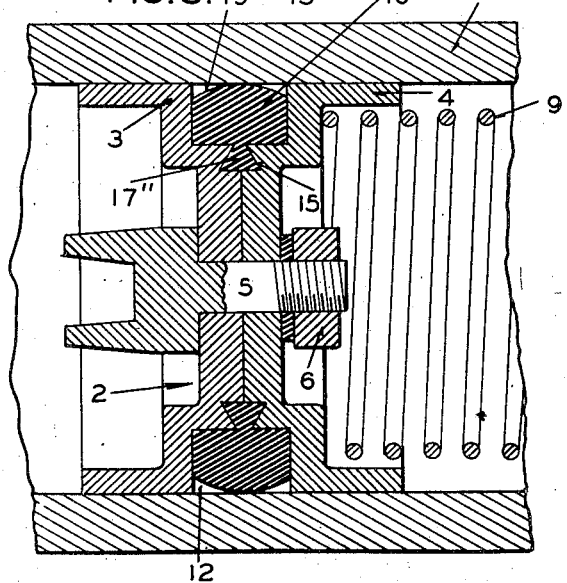
INVENTOR
BURNS DICK
BY *E. G. Huffman*
ATTORNEY Patented Mar. 23, 1948

2,438,153

UNITED STATES PATENT OFFICE 2,438,153

PISTON AND SEAL

Burns Dick, Ferguson, Mo., assignor to Wagner Electric Corporation, St. Louis, Mo., a corporation of Delaware Application January 7, 1944, Serial No. 517,358

3 Claims. (Cl. 309—23)

My invention relates to seals and more particularly to a piston and seal construction for use in a cylinder.

One of the objects of my invention is to provide an improved piston and seal combination.

Another object of my invention is to produce an improved sealing member of the ring type having a curved surface engaging a cylindrical surface.

Still another object of my invention is to so produce a seal of the ring type referred to and associate it with a member to be sealed that said ring will be prevented from becoming twisted by an irregular rolling movement.

Other objects of my invention will become apparent from the following description taken in connection with the accompanying drawings in which Figure 1 is a sectional view of a cylinder and a two-piece piston having sealing means embodying my invention associated therewith; Figure 2 is a sectional view showing a ring as it comes from a mold; Figure 3 is a view showing the top of a ring after the flash is removed; Figure 4 is a sectional view of a sealing ring for a grooved one-piece piston; and Figure 5 is a sectional view of another form of sealing ring for a two-piece piston.

Referring to the drawings in detail and first to Figure 1, a cylinder 1 is disclosed having a piston 2 reciprocable therein. This piston 2 is formed of two parts 3 and 4 secured together by means of a bolt 5 and a nut 6. The head end of the bolt is provided with a slot 7 which receives a member 8 to be actuated, such as a piston rod or the end of a brake shoe. A spring 9 is shown for biasing the piston so that member 8 and the head of the bolt are held in engagement.

The adjacent surfaces of parts 3 and 4 are of complementary form having annular recesses 10 and 11, respectively, which together form an annular groove 12 in the surface of the piston when the two parts are secured together, said groove having parallel side walls. The parts are also provided with complementary V-shaped recesses 13 and 14 which together form an annular groove 15 at the bottom of groove 12 when the parts of the piston are in secured relation. When formed, groove 15 is of general triangular cross-section with a small end communicating with groove 12.

Positioned in groove 12 is a sealing ring 16 of circular cross-section having a normal diameter which is less than the width of the groove, said ring being known as an O ring type of seal. This O ring carries an integral inwardly extending ridge 17 of general triangular cross-section for reception in groove 15. The ridge is of slightly larger dimensions than the groove so that when the two parts of the piston are secured together, the ridge will be clamped securely in groove 15 and thus provide a positive seal between the piston and the sealing ring 16. The ridge also has an additional function of preventing any excessive rolling movement of the sealing ring about its circular axis A, particularly such a rolling movement as would cause the ring to have its normal inner and outer surfaces reversed. The clamped ridge, however, does not prevent the ring from having slight rolling movement.

The outer diameter of the ring is such that when the piston and sealing ring are positioned in the cylinder, the ring will be radially compressed so that the peripheral surface of the ring will have pressure engagement with the cylinder wall, thus establishing a sealing action between the ring and the cylinder wall.

The sealing ring may be made of rubber, synthetic rubber, or rubber compound and it is produced by a molding operation. Prior sealing rings of the O ring type are made without any inwardly extending ridge, being simply a continuous circular ring of uniform diameter. In molding sealing rings a two-part mold is employed and this results in the ring, as it comes from the mold, having a flash, indicated at 18, on the section of ring 16 shown in Figure 2. A similar flash will also be provided diametrically opposite flash 18 when a completely circular ring is molded. However, when ring 16 is molded, the ridge 17 will eliminate any flash on the inner side of the ring. Before the sealing ring is ready for use, it is necessary to remove the flash 18. This is done by a knife or a grinder. In removing the flash it is practically impossible in production to so remove it that the ring will have a perfectly circular curve. The result is the establishment of a narrow cylindrical surface B extending completely around the ring, as best shown in full lines in Figure 3. When a ring having a complete circular cross-section is employed in a piston groove, there is nothing to prevent it from having free rotation about its circular axis A and consequently, the cylindrical surface B resulting from the removal of the flash can assume positions where it will not be in contact with the wall of the cylinder. One part of the ring may rotate more about its axis A than another part and consequently, the surface B will be positioned on first one side of the contact line between the ring and the cylinder wall and then on the other side as indicated by the dashed lines in Figure 3. In other words, the surface B will have a "snaky" path when the ring is viewed at right angles to its axis. This "snaky" path of surface B will not provide a perfect seal, particularly where the surface is changing from one side of the line of contact of the ring and cylinder to the other side as indicated at X in Figure 3.

With the sealing ring construction and the piston arrangement shown in Figure 1, the sealing ring cannot have such rolling movement as to cause it to be so twisted that the previously referred to "snaky" path of the surface B will result. The ridge 17 on the ring prevents any excessive rolling of the ring about the axis A. The ridge maintains the surface B in a predetermined position, which position will be where it is in continuous contact with the surface of the cylinder or continuously slightly to one side or the other of the contact line. It is also to be noted that with ridge 17 employed, there will be no second flash on the inside of the ring to be removed as this ridge 17 eliminates the flash during molding. This eliminates a possible point of leakage since ridge 17 becomes clamped between two parts of the piston and establishes a positive seal. The result is an efficient seal of the O ring type.

In Figure 4 there is shown a construction which can be employed in connection with a one-piece piston. The piston 2', which is reciprocable in cylinder 1', is of a one-piece construction and has an annular groove 12' in its surface. The circular sealing ring 16' is provided with an annular ridge 17' on its inner surface, said ridge being of a general rectangular cross-section. This ridge is adapted to be snugly received in an annular parallel sided groove 15' at the bottom of the groove 12'. The ridge 17' and the groove 15' prevent any excessive turning of the sealing ring about the axis of its circular section. Since the diameter of the ring, as normally molded, is greater than the depth of groove 12', the ring will be compressed and thus have pressure engagement with the wall of cylinder 1' and also with the bottom of groove 12' adjacent groove 15'. This will provide sufficient sealing action that fluid will not pass beneath the sealing ring.

In Figure 5 there is shown a construction similar to that of Figure 1 with the exception that the sealing ring 16", instead of being of general circular cross-section, is of general rectangular cross-section but is provided with a curved outer surface 19 when the ring is viewed in section. This ring is positioned in groove 12 of the two-part piston 2 which is constructed in the same manner as the two-part piston shown in Figure 1 and referred to by the same reference characters. The ring 16" is provided with an annular ridge 17" on its inner surface which fits in groove 15 and is clamped therein by the two parts 3 and 4 of the piston. The normal axial thickness of ring 16" may be slightly less than the width of groove 12 in the piston and its normal radial thickness is such, in relation to the width of the groove, that the ring will be compressed when the piston and ring are positioned in the cylinder. This insures that the curved surface of the ring will have pressure engagement with the cylinder wall. The ridge 17" holds the ring from having any excessive rotative shifting movement in the groove. The curved surface 19 of the ring insures that a minimum of friction will be present between the ring and the cylinder wall and also that the contacting surface of the ring and cylinder surface will be lubricated, particularly if the fluid employed in the cylinder operating on the piston is a liquid having some lubricating properties.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a cylinder member, a piston mounted therein comprising two members with the adjacent members provided with a first annular groove in their surface and a second annular groove at the bottom of the first groove, a sealing ring positioned in the first groove and having a generally circular cross-section for engagement with the cylindrical surface of the other member, said ring having a flattened section over a part of the periphery to engage with the curved surface of the other member, said sealing member also being provided with an extending portion on its surface opposite the curved surface for reception in the second groove, said extending portion of the ring and the second groove being so associated as to prevent the ring from becoming twisted when there is relative movement between the piston and cylinder members, and means for clamping said extending portion between said adjacent members.

2. In apparatus of the class described, a cylinder, a piston mounted therein comprising two parts with adjacent parts so formed as to provide an annular groove in their surface and a second narrower annular groove at the bottom of the first groove, a sealing ring of circular cross-section positioned in the first groove for cooperation with the cylinder wall and provided with an integral inwardly extending annular ridge on its inner surface positioned in the second groove, said ring having a flattened section over a part of the periphery to engage with the curved surface of the other member, said inwardly extending ridge of the ring and second groove being so associated as to prevent the ring from becoming twisted by an irregular rolling movement when there is relative movement between the piston and cylinder, and means for clamping said parts to said inwardly extending ridge.

3. In apparatus of the class described, a cylinder, a piston mounted therein, said piston comprising two parts and adjacent parts thereof being so formed as to provide an annular groove in its cylindrical surface, a sealing ring for the groove and having pressure engagement with the wall of the cylinder, said ring having an annular integral ridge extending from the inner surface of the ring, said parts being so formed as to receive the ridge therebetween, and means comprising a bolt extending through the two parts of the piston for securing said parts together and clamping the ridge therebetween, said bolt having its head end formed with a slot for receiving a member to be actuated.

BURNS DICK.

REFERENCES CITED

The following references are of record in the file of this patent:

UNITED STATES PATENTS

| Number | Name | Date |
|---|---|---|
| 938,095 | Vlack | Oct. 26, 1909 |
| 1,604,287 | Kibele | Oct. 26, 1926 |
| 1,713,031 | Deakins | May 14, 1929 |
| 1,921,996 | Van Hooydonk | Aug. 8, 1933 |
| 2,180,795 | Christensen | Nov. 21, 1939 |
| 2,314,683 | Berry | Mar. 23, 1943 |
| 2,326,116 | Baldwin | Aug. 10, 1943 |
| 2,349,170 | Jackman | May 16, 1944 |